(12) United States Patent
Khatri et al.

(10) Patent No.: US 10,395,039 B2
(45) Date of Patent: Aug. 27, 2019

(54) CUSTOMER-OWNED TRUST OF DEVICE FIRMWARE

(71) Applicant: Dell Products, L.P., Round Rock, TX (US)

(72) Inventors: Mukund P. Khatri, Austin, TX (US); Bill C. Munger, Round Rock, TX (US)

(73) Assignee: Dell Products, L.P., Round Rock, TX (US)

(*) Notice: Subject to any disclaimer, the term of this patent is extended or adjusted under 35 U.S.C. 154(b) by 172 days.

(21) Appl. No.: 15/262,236

(22) Filed: Sep. 12, 2016

(65) Prior Publication Data
US 2018/0075242 A1 Mar. 15, 2018

(51) Int. Cl.
*G06F 21/57* (2013.01)
*G06F 9/44* (2018.01)
*H04L 9/32* (2006.01)

(52) U.S. Cl.
CPC .......... *G06F 21/575* (2013.01); *H04L 9/3247* (2013.01); *H04L 9/3263* (2013.01); *G06F 9/44* (2013.01)

(58) Field of Classification Search
CPC ....................................................... G06F 1/575
See application file for complete search history.

(56) References Cited

U.S. PATENT DOCUMENTS

| | | | | |
|---|---|---|---|---|
| 2003/0163723 A1* | 8/2003 | Kozuch | .................. | G06F 21/57 726/34 |
| 2014/0095886 A1* | 4/2014 | Futral | .................. | G06F 21/572 713/187 |
| 2014/0365755 A1* | 12/2014 | Liu | ........................ | G06F 21/572 713/2 |
| 2015/0052616 A1* | 2/2015 | Hutchison | ............... | G06F 21/53 726/27 |
| 2015/0074387 A1* | 3/2015 | Lewis | .................. | G06F 21/575 713/2 |
| 2015/0193620 A1* | 7/2015 | Khatri | .................. | G06F 21/575 713/2 |
| 2016/0275291 A1* | 9/2016 | Campbell | ............. | G06F 21/575 |
| 2017/0230185 A1* | 8/2017 | Varadhan | .................. | G06F 8/63 |

* cited by examiner

*Primary Examiner* — Kim Huynh
*Assistant Examiner* — Kevin M Stewart
(74) *Attorney, Agent, or Firm* — Fogarty LLP

(57) ABSTRACT

Systems and methods for providing and verifying customer-owned trust of device firmware are described. In some embodiments, an Information Handling System (IHS), may include a processor and a Basic Input/Output System (BIOS) coupled to the processor, the BIOS having program instructions stored thereon that, upon execution, cause the IHS to: receive, from a user, selection of a pre-boot code module; export a digest of the pre-boot code module to the user; and import the digest signed by the user.

15 Claims, 6 Drawing Sheets

CUSTOMER-OWNED TRUST OF DEVICE FIRMWARE

FIELD

This disclosure relates generally to Information Handling Systems (IHSs), and more specifically, to systems and methods for providing and verifying customer-owned trust of device firmware.

BACKGROUND

As the value and use of information continues to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

In most IHSs, low-level code is used as an intermediary between hardware components and the Operating System (OS), as well as other high-level software. In some IHSs, this low-level code is known as the Basic Input/Output System (BIOS). The BIOS provides a set of software routines that allow high-level software to interact with hardware components using standard calls. Because of certain limitations of the original BIOS, a new specification for creating code that is responsible for booting the IHS has been developed that is called the Extensible Firmware Interface (EFI) Specification, and which has been extended by the Unified Extensible Firmware Interface Forum (UEFI).

The EFI Specification describes an interface between the OS and the system firmware. In particular, the EFI Specification defines the interface that platform firmware must implement and the interface that the OS may use in booting. The EFI Specification also specifies that protocols should be provided for EFI drivers to communicate with each other. An EFI protocol is an interface definition provided by an EFI driver. The EFI core provides protocols for allocation of memory, creating events, setting the clock, etc.

UEFI Secure Boot is an industry-standard mechanism in the system BIOS for authenticating pre-boot code modules (e.g., device drivers or other software or firmware code). The UEFI specification defines data structures and logic for the authentication process. The BIOS maintains a Secure Boot policy having X.509 certificates, public keys, and image digests. The BIOS enforces the Secure Boot policy for each pre-boot code module that loads during the boot process. If a pre-boot code module cannot be authenticated or does not otherwise satisfy the Secure Boot policy, the BIOS does not load that module.

The majority of pre-boot code modules in use today include I/O device firmware and OS boot loaders, which are signed by a single third-party certificate authority (CA). The inventors hereof have recognized, however, that it would be of great benefit to customers and developers to be able to use their own signing keys to sign pre-boot code modules, especially customers who are looking for secure cloud solutions, instead of trusting a third-party CA.

Conventional platforms offer a mechanism for removing default keys from the Secure Boot policy and importing custom keys. However, the inventors hereof have also recognized that using custom keys is relatively simple for OS boot loaders, but very difficult for device firmware. Particularly, OS boot loaders can be signed and then copied to the EFI System Partition. But, for I/O device firmware, customers need a way to obtain each firmware image they want to sign, and, after signing, those customers need a secure way to install the signed images back onto the devices.

A traditional solution to the foregoing problem is for the customer (or the Original Equipment Manufacturer or "OEM") to work with each supplier directly to obtain the supplier's UEFI firmware image in PE/COFF format (required by Secure Boot signature verification). Each supplier then also provides a secure mechanism to update the device with firmware images signed by the customer.

The inventors hereof have recognized, however, that the traditional solution is undesirable for many reasons. Particularly, the large number of components and firmware used by the various devices in any modern IHS creates a need for each customer to interact with a large number of device suppliers, which increases deployment and maintenance time.

SUMMARY

Embodiments of systems and methods for providing and verifying customer-owned trust of device firmware are described. In an illustrative, non-limiting embodiment, an Information Handling System (IHS) may include a processor; and a Basic Input/Output System (BIOS) coupled to the processor, the BIOS having program instructions stored thereon that, upon execution, cause the IHS to: receive, from a user, selection of a pre-boot code module; export a digest of the pre-boot code module to the user; and import the digest signed by the user. For example, the pre-boot code module may include an input/output (I/O) device firmware. Additionally or alternatively, the boot code module may include an Operating System (OS) boot loader.

In some implementations, the program instructions may cause the IHS to provide a list of pre-boot code modules to the user prior to receiving the selection from the user. The receiving, exporting, and importing operations may be performed, for example, via a baseboard management controller (BMC). Moreover, the selection may include other pre-boot code modules, exporting the digest may include exporting a distinct digest for each of the selected pre-boot code modules, and/or importing the digest may include importing each of the distinct digests signed with a same or a different key.

Additionally or alternatively, the program instructions may cause the IHS to: store a public key or certificate usable to authenticate the signed digest in a primary database of a Secure Boot policy; and store the signed digest in a secondary database of the Secure Boot policy. Additionally or alternatively, the program instructions may cause the IHS to allow the user to remove a Certificate Authority (CA)-issued public key or certificate corresponding to the selected pre-boot code module from the primary database.

Additionally or alternatively, the program instructions may cause the IHS to, in response to the pre-boot code module failing Secure Boot verification during a subsequent booting of the IHS, calculate a digest for the pre-boot code module, search the secondary database of the Secure Boot policy for a digest matching the calculated digest, in response to finding the matching digest in the secondary database, verify the signature of the matching digest against one or more public keys or certificates stored in the primary database of the Secure Boot policy; and in response to verification of the signature of the matching digest, load the pre-boot code module.

Additionally or alternatively, the program instructions may cause the IHS to store the digest in a primary database of a Secure Boot policy. The pre-boot code module may be selected indirectly as part of an operation initiated by the user to trust a current IHS configuration, and the current IHS configuration may include additional pre-boot code modules.

Additionally or alternatively, the program instructions may cause the IHS to remove digests from the primary database of the Secure Boot policy for pre-boot code modules previously trusted as part of a previous IHS configuration, calculate digests for pre-boot code modules part of the current IHS configuration, and store the calculated digests in the primary database of the Secure Boot policy. Additionally or alternatively, the program instructions may cause the IHS to receive, from the user, selection of another pre-boot code module; and add a digest of the another pre-boot code module to a revoked signature database of a Secure Boot policy.

In another illustrative, non-limiting embodiment, a BIOS may have program instructions stored thereon that, upon execution by a processor of an IHS, cause the IHS to: provide a list of pre-boot code modules to a user; receive, from the user, selection of a pre-boot code module; export a digest of the pre-boot code module to the user; import the digest signed by the user; store a public key or certificate usable to authenticate the signed digest in a primary database of a Secure Boot policy; and store the signed digest in a secondary database of the Secure Boot policy.

In yet another illustrative, non-limiting embodiment, in a IHS having a BIOS, a method may include: providing, by the IHS through execution of program instructions stored in the BIOS, a list of pre-boot code modules; receiving, at the IHS through execution of program instructions stored in the BIOS, selection of a pre-boot code module; exporting, by the IHS through execution of program instructions stored in the BIOS, a digest of the pre-boot code module; importing, by the IHS through execution of program instructions stored in the BIOS, the digest signed by the user; storing, by the IHS through execution of program instructions stored in the BIOS, a public key or certificate usable to authenticate the signed digest in a primary database of a Secure Boot policy; and storing, by the IHS through execution of program instructions stored in the BIOS, the signed digest in a secondary database of the Secure Boot.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

In various embodiments, systems and methods described herein may provide and verify customer-owned trust of device firmware. These techniques may reduce or eliminate dependencies on suppliers by enabling customers to control verification for device firmware in a scalable manner, beginning at deployment and continuing throughout an Information Handling System (IHS)'s lifecycle, such as through firmware updates, repair, and/or replacement.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail below.

Figure 1:
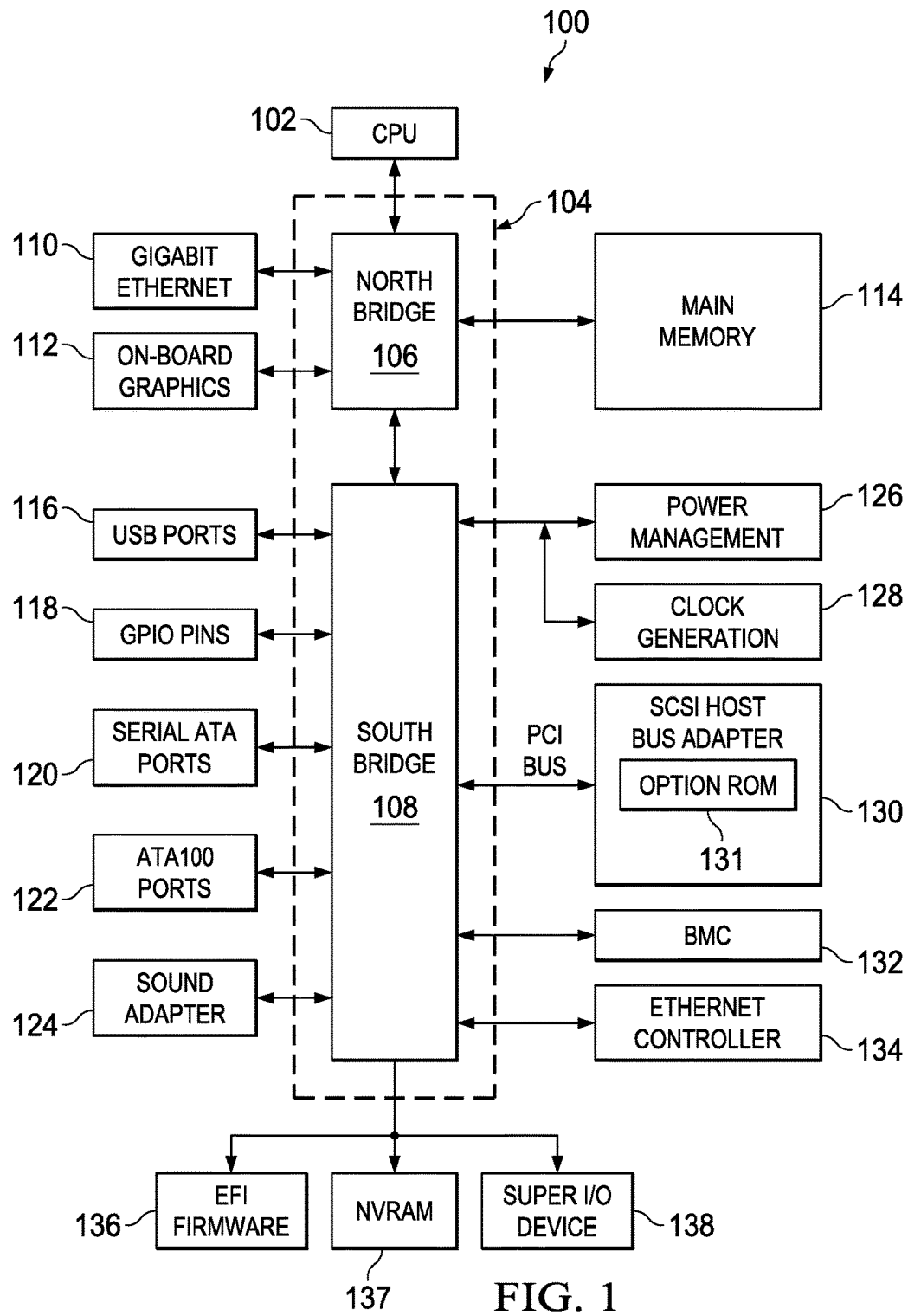
FIG. 1 is a block diagram of an example of an Information Handling System (IHS) configured to implement systems and methods according to some embodiments.

FIG. 1 shows an example of an IHS configured to implement systems and methods described herein. It should be appreciated that although certain embodiments may be discussed in the context of a desktop or server computer, other embodiments may be utilized with virtually any type of IHS. In this example, the IHS is configured to provide and verify customer-owned trust of device firmware, as explained in more detail below.

Particularly, the IHS includes a baseboard or motherboard 100, which is a printed circuit board (PCB) to which components or devices are mounted to by way of a bus or other electrical communication path. For example, Central Processing Unit (CPU) 102 operates in conjunction with a chipset 104; CPU 102 is a processor that performs arithmetic and logical operations necessary for the functioning of IHS 100.

Chipset 104 includes northbridge 106 and southbridge 108. Northbridge 106 provides an interface between CPU 102 and the remainder of the IHS. Northbridge 106 also provides an interface to a RAM used as main memory 114 in the IHS and, possibly, to on-board graphics adapter 112. Northbridge 106 may also be configured to provide networking operations through Ethernet adapter 110. Ethernet adapter 110 is capable of connecting the IHS to another IHS (e.g., a remotely located IHS) via a network. Connections which may be made by network adapter 110 may include local area network (LAN) or wide area network (WAN) connections. Northbridge 106 is also coupled to southbridge 108.

Southbridge 108 is responsible for controlling many of the Input/Output (I/O) operations of the IHS. In particular, southbridge 108 may provide one or more Universal Serial Bus (USB) ports 116, sound adapter 124, Ethernet controller 134, and one or more general purpose input/output (GPIO) pins 118. Southbridge 108 may also provide a bus for interfacing peripheral card devices such as BIOS boot system-compliant SCSI host bus adapter 130. In some embodiments, the bus may include a peripheral component interconnect (PCI) bus. Southbridge 108 may also provide baseboard management controller (BMC) 132 for use in managing the various components of the IHS. Power management circuitry 126 and clock generation circuitry 128 may also be utilized during the operation of southbridge 108.

Additionally, southbridge 108 is configured to provide one or more interfaces for connecting mass storage devices to the IHS. For instance, in an embodiment, southbridge 108 may include a serial advanced technology attachment (SATA) adapter for providing one or more serial ATA ports 120 and/or an ATA100 adapter for providing one or more ATA100 ports 122. Serial ATA ports 120 and ATA100 ports 122 may be, in turn, connected to one or more mass storage devices storing an operating system (OS) and application programs. An OS comprises a set of programs that control operations of the IHS and allocation of resources. An application program is software that runs on top of the OS and uses computer resources made available through the OS to perform application specific tasks desired by the user.

Mass storage devices connected to southbridge 108 and SCSI host bus adapter 130, and their associated computer-readable media provide non-volatile storage for the IHS. Although the description of computer-readable media contained herein refers to a mass storage device, such as a hard disk or CD-ROM drive, it should be appreciated a person of ordinary skill in the art that computer-readable media can be any available media on any memory storage device that can be accessed by the IHS. Examples of memory storage devices include, but are not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices.

A low pin count (LPC) interface may also be provided by southbridge 108 for connecting Super I/O device 138. Super I/O device 138 is responsible for providing a number of I/O ports, including a keyboard port, a mouse port, a serial interface, a parallel port, and other types of input/output ports.

The LPC interface may connect a computer storage media such as a ROM or a flash memory such as a non-volatile random access memory (NVRAM) for storing BIOS/EFI firmware 136 that includes BIOS program code containing the basic routines that help to start up the IHS and to transfer information between elements within the IHS. BIOS/EFI firmware 136 comprises firmware compatible with the EFI Specification and Framework.

The LPC interface may also be utilized to connect NVRAM 137 to the IHS. NVRAM 137 may be utilized by BIOS/EFI firmware 136 to store configuration data for the IHS. In other embodiments, configuration data for the IHS may be stored on the same NVRAM 137 as BIOS/EFI firmware 136.

BMC 132 may include non-volatile memory having program instructions stored thereon that enable remote management of the IHS. For example, BMC 132 may enable a user to discover, configure, and manage the IHS, setup configuration options, resolve and administer hardware or software problems, etc. Additionally or alternatively, BMC 132 may include one or more firmware volumes, each volume having one or more firmware files used by the BIOS' firmware interface to initialize and test components of the IHS.

As a non-limiting example of BMC 132, the integrated DELL Remote Access Controller (iDRAC) from DELL, INC. is embedded within DELL POWEREDGE servers and provides functionality that helps information technology (IT) administrators deploy, update, monitor, and maintain servers with no need for any additional software to be installed. The iDRAC works regardless of OS or hypervisor presence from a pre-OS or bare-metal state, because iDRAC is embedded within the IHS from the factory.

It should be appreciated that, in other embodiments, the IHS may comprise other types of computing devices, including hand-held computers, embedded computer systems, personal digital assistants, and other types of computing devices. It is also contemplated that the IHS may not include all of the components shown in FIG. 1, may include other components that are not explicitly shown in FIG. 1, or may utilize a different architecture.

Figure 2:
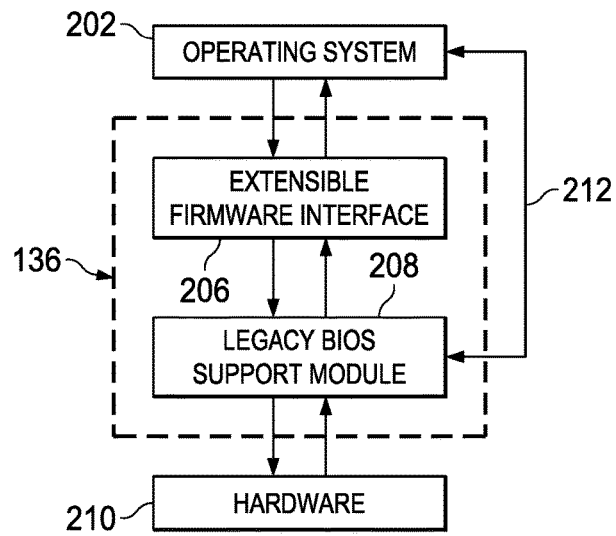
FIGS. 2 and 3 are block diagrams of examples of aspects of an Extensible Firmware Interface (EFI) environment utilized by systems and methods according to some embodiments.

Referring now to FIG. 2, examples of aspects of an EFI environment created by BIOS/EFI firmware 136 of the IHS are described. As shown, BIOS/EFI firmware 136 comprises firmware compatible with the EFI Specification from INTEL CORPORATION or from the UEFI FORUM. The EFI Specification describes an interface between OS 202 and BIOS/EFI firmware 136. Particularly, the EFI Specification defines the interface that BIOS/EFI firmware 136 implements and the interface that OS 202 may use in booting.

According to an implementation of EFI, both EFI 206 and legacy BIOS support module 208 may be present in BIOS/EFI firmware 136. This allows the IHS to support both firmware interfaces. In order to provide this, interface 212 may be used by legacy OSs and applications. Additional details regarding the architecture and operation of the EFI 206 are provided below with respect to FIG. 3. Moreover, additional details regarding the operation and architecture of EFI can be found in the EFI Specification and Framework, which are available from INTEL CORPORATION.

Figure 3:
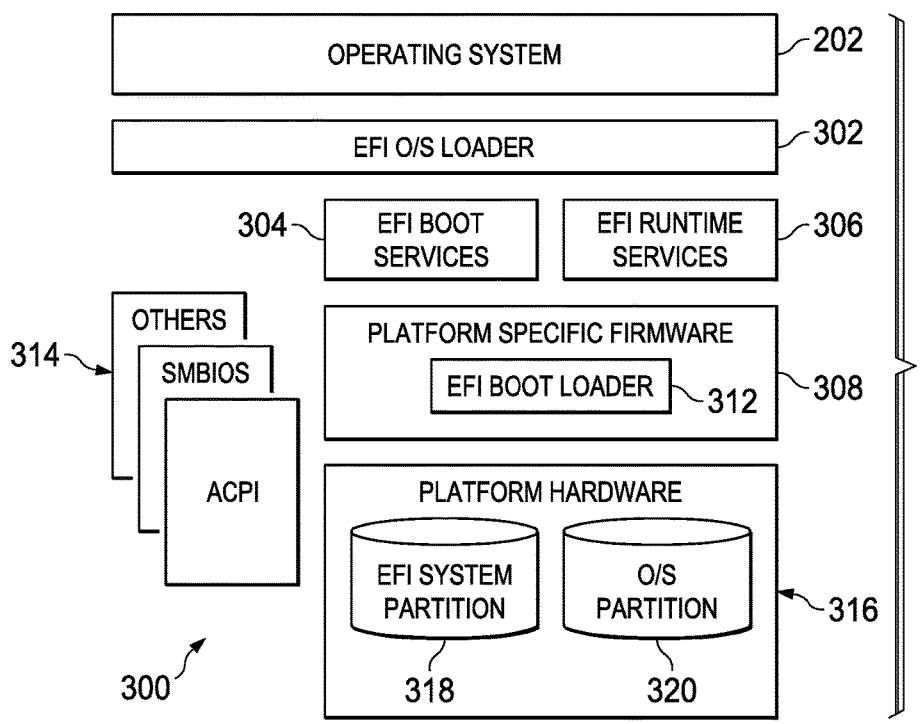

FIG. 3 provides additional details regarding an EFI Specification-compliant system 300 utilized to provide customer-owned trust of device firmware. As shown, system 300 includes platform hardware 316 and OS 202. Platform firmware 308 may retrieve an OS image from EFI system partition 318 using an EFI O/S loader 302. EFI system partition 318 may be an architecturally shareable system partition. As such, EFI system partition 318 defines a partition and file system that are designed to allow safe sharing of mass storage between multiple vendors. O/S partition 320 may also be utilized.

Once started, EFI O/S loader 302 continues to boot the complete OS 202. In doing so, EFI O/S loader 302 may use EFI boot services 304 and interface to other supported specifications to survey, comprehend, and initialize the various platform components and the operating system software that manages them. Thus, interfaces 314 from other specifications may also be present on system 300. For example, the Advanced Configuration and Power Management Interface (ACPI) and the System Management BIOS (SMBIOS) specifications may be supported.

EFI boot services 304 provide interfaces for devices and system functionality that can be used during boot time. EFI runtime services 306 may also be available to the O/S loader 302 during the boot phase. For example, a minimal set of runtime services may be presented to ensure appropriate abstraction of base platform hardware resources that may be needed by the operating system 202 during its normal operation. EFI allows extension of platform firmware by loading EFI driver and EFI application images which, when loaded, have access to all EFI-defined runtime and boot services.

Various program modules provide boot and runtime services. These program modules may be loaded by the EFI boot loader 312 at system boot time. EFI boot loader 312 is a component in the EFI firmware that determines which program modules should be explicitly loaded and when. Once the EFI firmware is initialized, it passes control to boot loader 312. Boot loader 312 is then responsible for determining which of the program modules to load and in what order.

The various program modules executing within the EFI may have a need to receive user input or to display information on an output device, such as a display screen. In order to provide this functionality, BIOS/EFI firmware 136 provides an HII database and an HII database driver that exposes methods for accessing the database through a HII database protocol interface. The HII database driver maintains the internal data structures for storing information in the HII database, and for providing access to input devices, forms, strings, and fonts stored in the HII database.

In operation, each time IHS 100 is powered on, BIOS/EFI firmware 136 is executed by CPU 102. The UEFI boot flow can be divided into a sequence of phases, including, in order: Security (SEC), pre-EFI initialization (PEI), driver execution environment (DXE), boot device selection (BDS), and run time (RT).

First, BIOS/EFI firmware 136 enters the SEC phase, where memory has not yet been initialized, and CPU 102's cache is used as RAM to pre-verify CPU 102, chipset 104, and motherboard 100. Next, BIOS/EFI firmware 136 enters the PEI phase, where CPU 102, chipset 104, motherboard 100, and main memory 114 are initialized. In the Driver Execution (DXE) phase that follows, boot services, runtime services, and driver execution dispatcher services may be executed to initialize other hardware in IHS 100. In the BDS phase, attempts are made to initialize console devices as well as various drivers corresponding to the boot loader for the OS. In the TSL phase, control is handed off to the OS to continue the start up of IHS 100 before reaching the RT phase of normal operation.

Again, the PEI phase (prior to DXE) is responsible for initializing permanent memory in the platform so that the DXE phase can be loaded and executed. The DXE phase is where most of the system initialization is performed. In various embodiments, it is also during the DXE phase that systems and methods for providing and verifying customer-owned trust of device firmware may be implemented using a Secure Boot policy, as described herein.

There are several components in the DXE phase, including the DXE Foundation, DXE Dispatcher, and DXE Drivers. The DXE Foundation is designed to be completely portable with no processor, chipset, or platform dependencies. For example, the DXE Foundations does not contain any hard-coded addresses or any platform-specific information. The DXE Foundation produces a UEFI System Table, and the UEFI System Table is consumed by every DXE driver and executable image invoked by the DXE Dispatcher. It contains all the information required for these components to utilize the services provided by the DXE Foundation and the services provided by any previously loaded DXE driver. For example, the DXE Foundation includes a Firmware Volume Driver, a DXE dispatcher, a Section Extraction Protocol Driver, and other components.

After the DXE Foundation is initialized, control is handed to the DXE Dispatcher. The DXE Dispatcher examines every firmware volume that is present in the system. Firmware volumes are either declared by hand-offblocks (HOBs), or they are declared by DXE drivers. The DXE Dispatcher is responsible for loading and invoking DXE drivers found in firmware volumes. Some DXE drivers may depend on the services produced by other DXE drivers, so the DXE Dispatcher is also required to execute the DXE drivers in the correct order. The DXE Dispatcher may be flexible enough to support a variety of platform specific security policies for loading and executing DXE drivers from firmware volumes. Some platforms may choose to run DXE drivers with no security checks and others may choose to check the validity of a firmware volume before it is used, and other may choose to check the validity of every DXE driver in a firmware volume before it is executed.

In order to support platform specific security policies for DXE driver execution, the DXE Dispatcher is required by the UEFI Platform Initialization (PI) specification to use the services of the Security Architecture Protocol (SAP) every time a firmware volume is discovered and every time a DXE driver is loaded. As part of SAP, "Secure Boot" provides a mechanism for authenticating pre-boot code modules (e.g., drivers and loaders) that can be installed during boot initialization of IHS 100.

The Secure Boot algorithm provided by the UEFI specification is configured to prevent the loading of UEFI drivers and OS loaders that are not signed with an acceptable digital signature. Secure Boot accomplishes this by maintaining databases of software signers and software images that are pre-approved to run on IHS 100. In particular, a Secure Boot policy defines signature databases for storing signers or image hashes of UEFI applications, software loaders, and UEFI device drivers that can be loaded on the computer during an initialization (boot) procedure.

Figure 4:
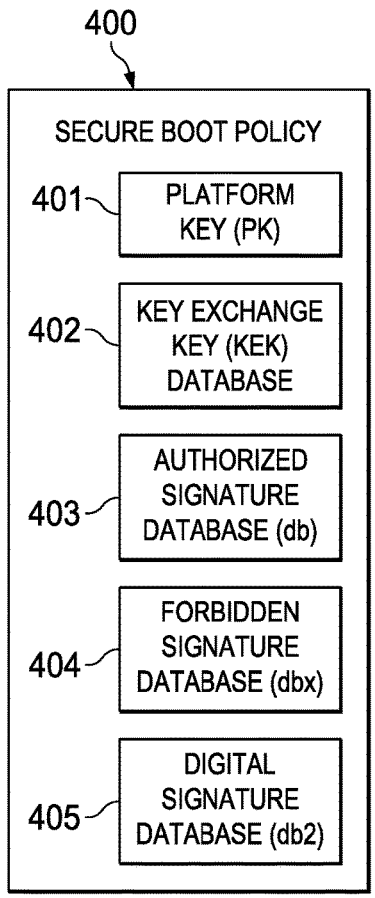
FIG. 4 is a block diagram of an example of a Secure Boot policy according to some embodiments.

To better illustrate the foregoing, FIG. 4 is a block diagram of an example of Secure Boot policy 400. As illustrated, Secure Boot policy 400 includes platform key (PK) 401, Key Exchange Key (KEK) database 402, primary authorized signature database (db) 403, and revoked signature database (dbx) 404. In various embodiments, policy 400 may be extended by including secondary digital signature database db2 405, which is distinct from db 403. For example, whereas db 403 allows storage of public keys, certificates, and hashes, it does not allow storage of signed image digests or hashes. Therefore, in various embodiments, signed image digests or hashes are stored in db2 405, the use of which is explained in more detail in connection with FIGS. 5 and 6A-B below.

In some embodiments, Secure Boot policy 400 is usable by BIOS/EFI firmware 136 of IHS 100 to determine whether or not to load one or more pre-boot code modules, for example, during a DXE phase of a booting process. As used herein, the term "pre-boot code module" refers to any Unified EFI (UEFI) image that begins executing before the ExitBootServices( ) operation completes. Examples of pre-boot code modules include, but are not limited to, device I/O firmware and OS boot loaders. In many situations, the user may not have access to the image of the driver, firmware, or boot loader.

In some cases, primary database db 403 may store a signature authorizing execution of an OS loader, such as, for example, the MICROSOFT BOOT MANAGER. Revoked signature database dbx 404 may be used for storing keys, certificates, or hashes for images that are no longer trusted and may not be loaded during a boot procedure. For example, a Secure Boot compliant BIOS is configured to execute a signed device driver only if the driver is identified in db 403, and will refuse to execute the driver if the driver is identified in dbx 404. The Secure Boot policy further defines PK 401, which can be used to verify updates to KEK 402. In some embodiments, KEK 402 may be a separate database of signing keys that can be used to verify updates to databases db 403 and dbx 404.

Databases PK 401, KEK 402, db 403, dbx 404, and db2 405 may be stored as authenticated UEFI non-volatile variables in the BIOS/EFI 136's flash memory. For example, an original equipment manufacturer (OEM) can store db 403, dbx 404, PK 401, and KEK 402 databases on the firmware nonvolatile random access memory (NVRAM) at manufacturing time.

During power-on-self-test (POST), a LoadImage( ) function loads each UEFI image (UEFI executable) into memory and returns a unique handle to each image. Each time the UEFI Loadimage( ) function is called, Secure Boot verification code is invoked to make sure the image is from a trusted source—for example, whether the driver's certificate is included in db 403 and is not included in dbx 404.

Figure 5:
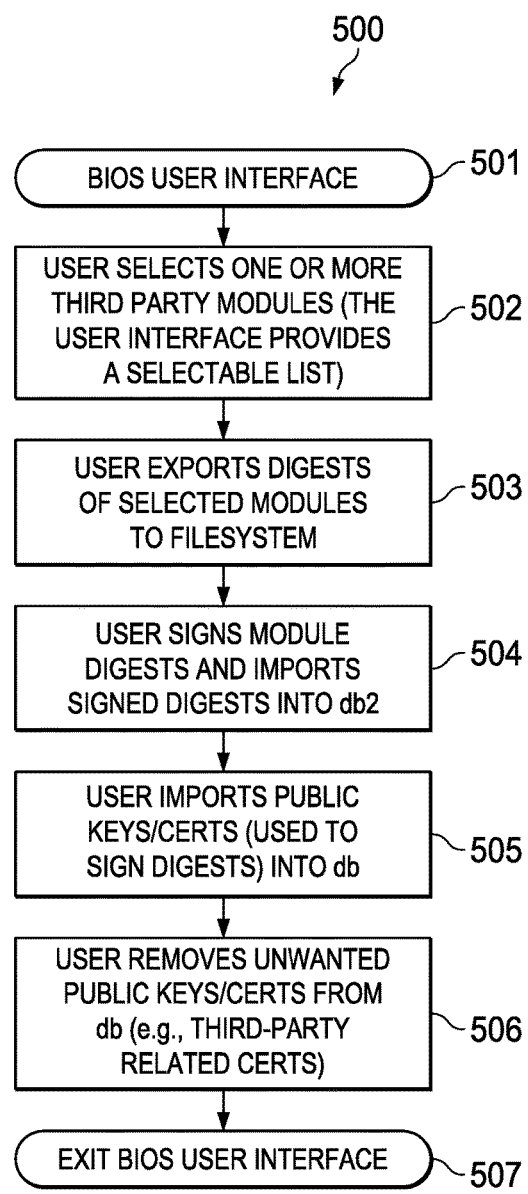
FIG. 5 is a flowchart of an example of a method for providing customer-owned trust of device firmware according to some embodiments.

FIG. 5 is a flowchart of an example of method 500 for providing customer-owned trust of device firmware. In various embodiments, method 500 may be performed through execution, by processor 102 of IHS 100, of program instructions stored in BIOS/EFI firmware 136. Particularly, method 500 provides BIOS user interface at block 501. The BIOS user interface may include a service, setup, or configuration menu or screen having a list of third-party pre-boot code modules. In some cases, BIOS/EFI firmware 136 may construct such a list while enforcing a default Secure Boot policy during the boot process. At block 502 a user selects one or more third-party pre-boot code modules, for example, on a selectable list of the user interface.

After the user selects one or more modules, BIOS/EFI firmware 136 exports image digests corresponding to those modules to a file system at block 503. Image digests, also known as "hashes," may be obtained through application of a cryptographic hash function to an image of a pre-boot code module. At block 504, the user then signs each digest with their custom key(s). The user may either sign each digest individually, or may sign multiple digests as a group (with a single signature or certificate), and these signed image digests serve as customer-owned digital signatures for the pre-boot code modules.

Still at block 504, the user imports digital signatures for each pre-boot code module into secondary signature database db2 405 of Secure Boot policy 400. This database may reside in non-volatile storage—e.g., a flash device within BIOS/EFI firmware 136. At block 505, the user also imports their custom public keys or certificates (used for the signing process at block 504) into the primary Authorized Signature Database db 403 of Secure Boot policy 400.

At block 506, the user may remove any unwanted public keys or certificates from primary database db 403 (e.g., third party-related certificates). Then, at block 507, method 500 exits the BIOS user interface.

Figure 6A:
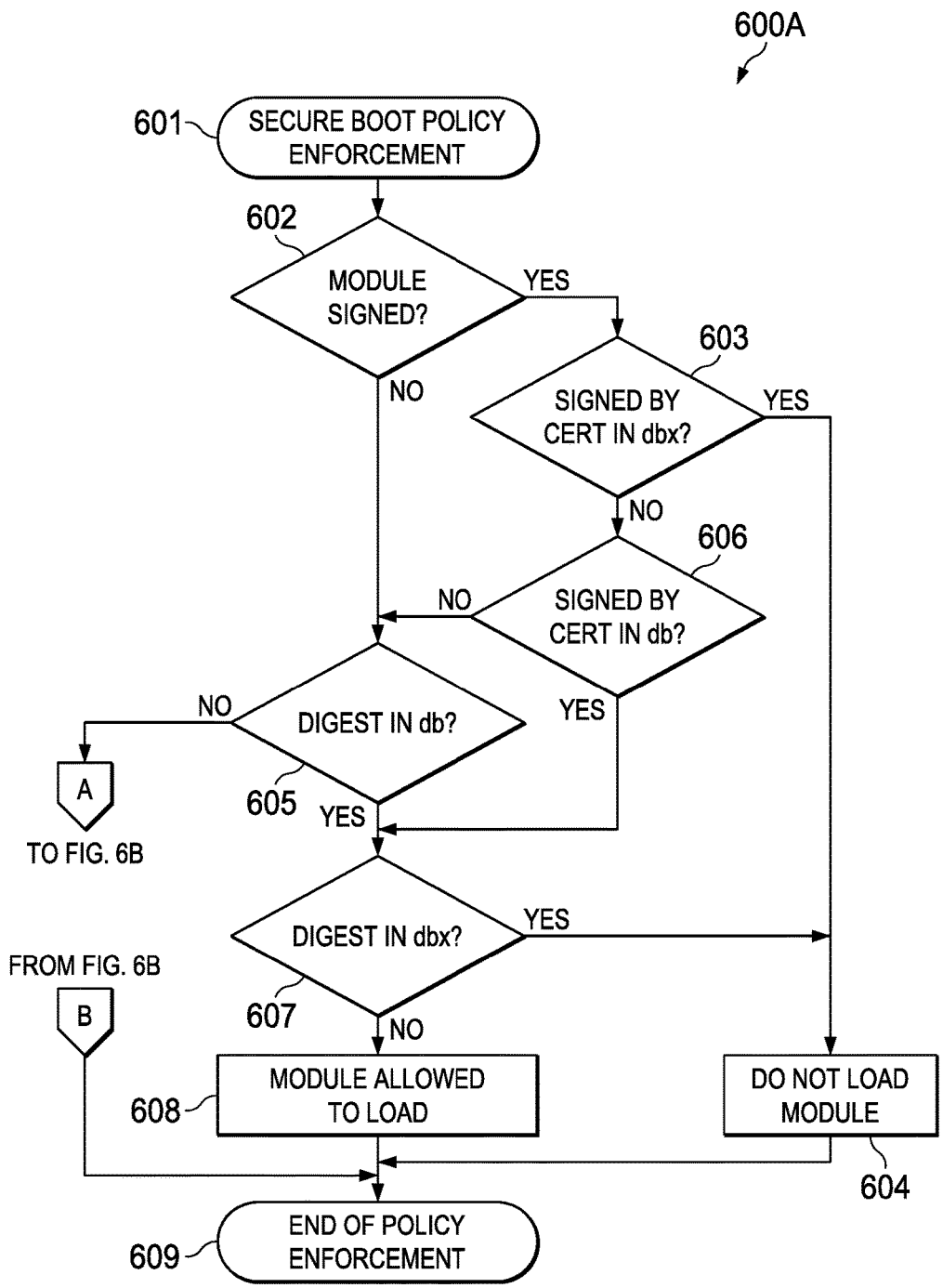
FIGS. 6A-B are flowcharts of an example of a method for verifying customer-owned, trusted device firmware according to some embodiments.
Figure 6B:
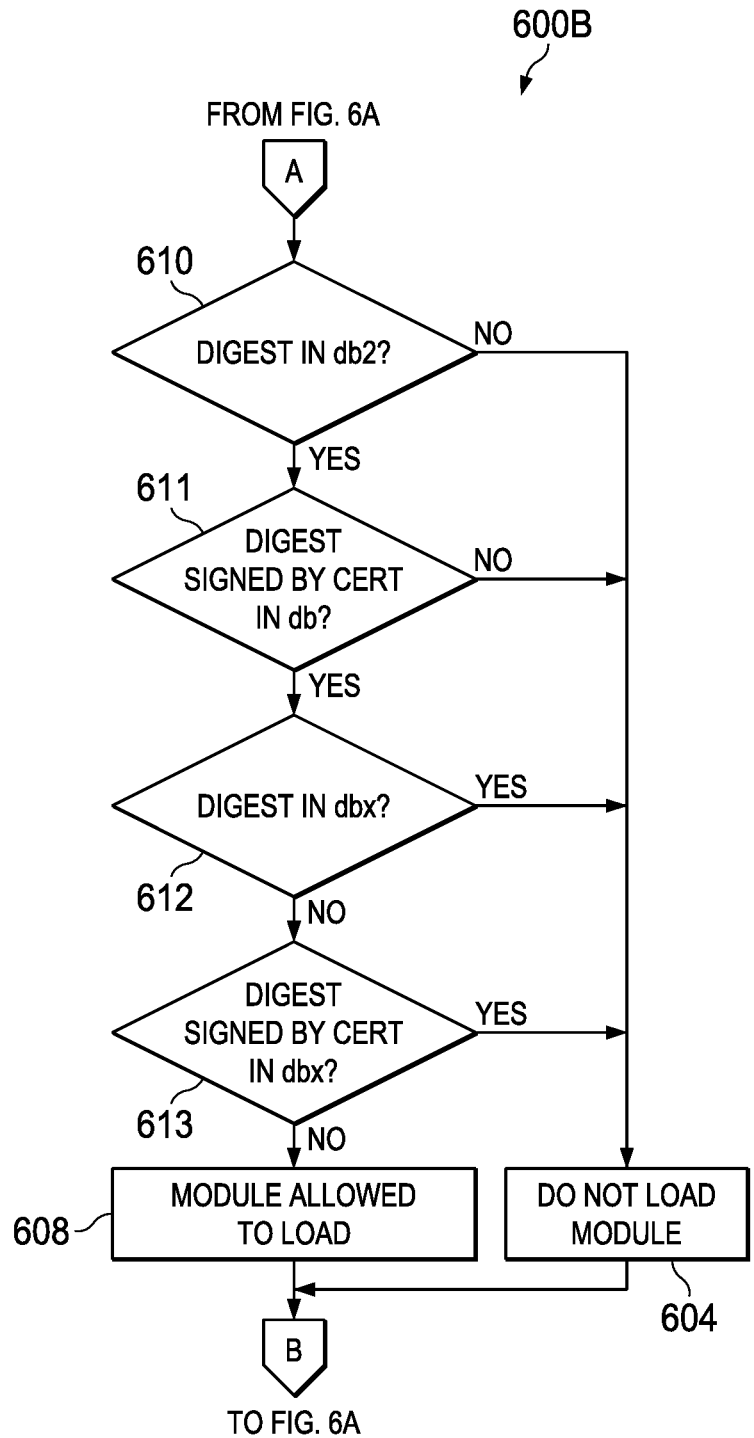

With respect to enforcement of Secure Boot Policy 400, FIGS. 6A-B are flowcharts of method 600A-B (generically referred to as "method 600") for verifying customer-owned trust of device firmware. To clarify, in method 600A-B, trust is customer-owned, but not necessarily the device firmware itself—i.e., the firmware can come from a third party, but the trust (e.g., the keys used for signing and verification) comes from the customer.

In various embodiments, method 600 may be performed through execution, by processor 102 of IHS 100, of program instructions stored in BIOS/EFI firmware 136. Particularly, during signature verification for each pre-boot code module, BIOS/EFI firmware 136 begins executing an enforcement process indicated as block 601 in portion 600A of method 600.

At block 602, method 600 determines whether a particular pre-boot code module is signed. If so, block 603 determines whether the signed pre-boot code module is signed using a key or certificate stored in dbx 404. If so, block 604 does not load the module and block 609 represents the end of the policy enforcement with respect to that pre-boot code module.

If the module has been signed, as determined in block 602, and its key or signature is not in dbx 404, as determined by block 603, but the key or signature is in db 403, as determined by block 606, control passes to block 607. If the module has been signed using a key or certificate that is not stored in db 403, as determined by block 606, then control passes to block 605. If the module is not signed, as determined by block 602, but the module's digest is in db 403, as determined by block 605, control also passes to block 607.

At block 607, method 600 determines whether the image digest of the pre-boot code module is in dbx 404. If so, method 600 proceeds to block 604, where the module is not allowed to load. Conversely, if the digest of the pre-boot code module is absent from dbx 404, block 608 allows the module to load before block 609 ends the Secure Boot policy enforcement with respect to that module.

With respect to portion 600A, if the user relies only on custom keys instead of default third-party keys, the signature verification will fail at block 605 because the third-party code module is signed by a third-party key (an unwanted key that was removed from db 403 in block 506), and the digest of the third-party code module is not in db 403. In that case, control passes to block 610, shown in portion 600B (FIG. 6B) of method 600.

In various implementations, method 600 calculates the image digest of the otherwise verification-failed pre-boot code module, and then searches db2 405 at block 610. If the digest is found in db2 405, BIOS/EFI firmware 136 uses keys and certificates in db 403 to verify the signature of the digest at block 611. If the user imported custom keys or certificates into db 403 (e.g., at block 505 of method 500), method 600 authenticates the digest successfully at block 608 and therefore trusts the image—so long as the digest is not present in dbx 404, as determined in block 612, and so long as the digest not signed using a key or certificate stored in dbx 405, as determined in block 613.

Conversely, if the digest is not in db2 405, if the digest is not signed by a key or certificate stored in db 403, if the digest is in dbx 405, or if the digest is signed by a certificate or key stored in dbx 405, control passes to block 604 and the pre-boot code module at issue is not loaded. That is, when the signature of the digest cannot be verified using Secure Boot policy 400, the BIOS/EFI firmware 136 does not trust the image.

The foregoing embodiment offers a scalable way for customers to rely on their own keys for authenticating third-party device firmware. Customers can scale this solution to new suppliers/devices without needing to work directly with each supplier for support. The customer has control over the signing keys used to authenticate pre-boot modules, which can be lucrative, for example, for customers looking for secure cloud solutions or the like.

Figure 7:
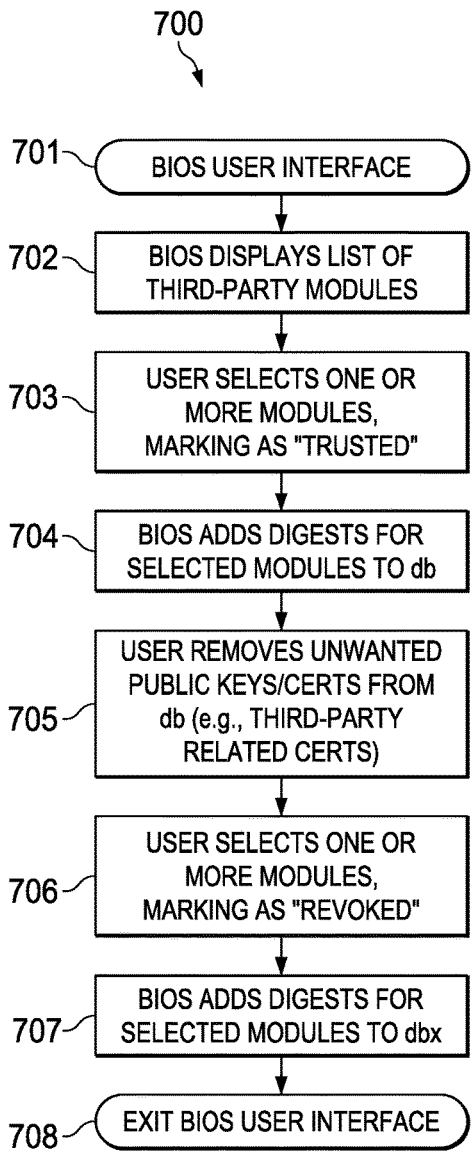
FIG. 7 is a flowchart of an example of another method for providing customer-owned trust of device firmware according to some embodiments.

FIG. 7 is a flowchart of an example of an alternative method 700 for providing customer-owned trust of device firmware. Similarly as described above, method 700 may be performed through execution, by processor 102 of IHS 100, of program instructions stored in BIOS/EFI firmware 136. In this embodiment, method 700 begins by again providing a BIOS user interface at block 701. For example, at block 702, BIOS/EFI firmware 136 may support a user interface with a list of pre-boot code modules in IHS 100. The user selects one or more pre-boot code modules and marks them as "trusted" at block 703.

Later, when the user saves their changes in the BIOS user interface at block 704, BIOS/EFI firmware 136 adds the image digests of the trusted pre-boot code modules to db 403 in Secure Boot policy 400. On a next or subsequent boot, BIOS/EFI firmware 136 authenticates and loads the pre-boot code modules because their image digests are present in db 403.

At block 705, method 700 also provides an opportunity for the user to remove unwanted public keys or certificates from db 403 (e.g., third-party certificates). The user interface also provides a way for the user to mark one or more modules as "not trusted" or "revoked" in block 706. In this case, in block 707, BIOS/EFI firmware 136 adds digests for the selected modules to dbx 404 of Secure Boot policy 400. For example, if a security vulnerability is discovered in a certain revision of a module, the user can revoke trust for that revision. Method 700 then ends at block 708.

An advantage of method 700 is that it reduces or eliminates the need to obtain firmware images from various device suppliers while addressing the need for a secure way to install signed firmware images.

Figure 8:
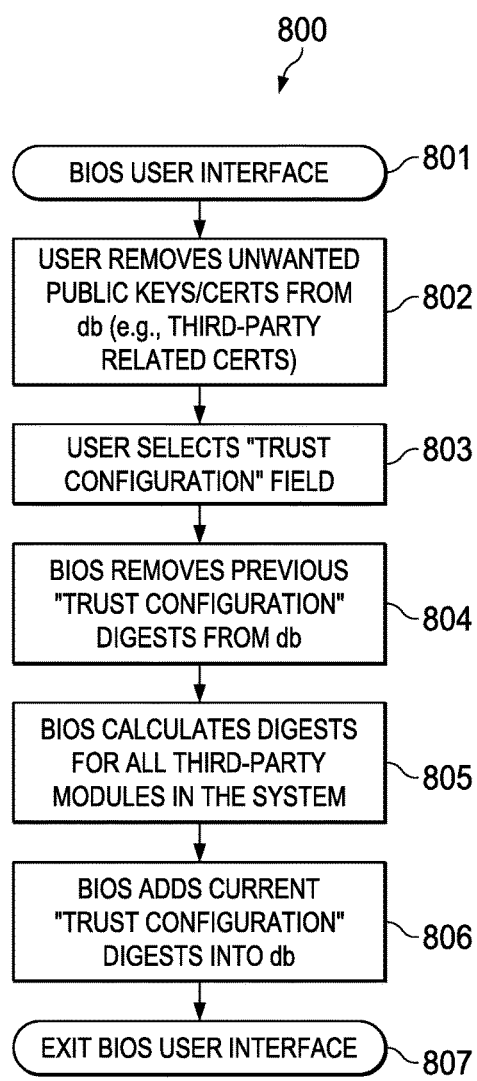
FIG. 8 is a flowchart of an example of yet another method for providing customer-owned trust of device firmware according to some embodiments.

FIG. 8 is a flowchart of an example of a yet alternative method 800 for providing customer-owned trust of device firmware. Similarly as described above, method 800 may be performed through execution, by processor 102 of IHS 100, of program instructions stored in BIOS/EFI firmware 136. In this embodiment, rather than offering a list of pre-boot code modules present in IHS 100, BIOS/EFI firmware 136 provides a user interface with a "Trust Configuration" option at block 803 after allowing the user to remove unwanted public keys or certificates from db 403. Then, instead of selecting one or more pre-boot code modules, the user asserts this one option to trust all pre-boot code modules in the current configuration.

At block 804, BIOS/EFI firmware 136 removes image digests from a previous "Trust Configuration" operation. For example, BIOS/EFI firmware 136 may be configured to track this using a SignatureOwner GUID associated with each digest. Then, at block 805, BIOS/EFI firmware 136 calculates image digests for all the current third-party pre-boot code modules. At block 806, method 800 adds the digests to db 403 of Secure Boot policy 400, and method 800 ends at block 807 when it exits the BIOS user interface.

It should be noted that the various systems and methods described herein scale to a datacenter, thus enabling customer-owned secure clouds. The local BIOS/EFI firmware 136 user interface components may be extended to out-of-band consoles, and these consoles can control provisioning of the Secure Boot policy in a one-to-many fashion.

For example, in some cases, scaling these solutions enables customers to implement a Custom Secure Cloud. Customers control the authentication of pre-boot code modules across their entire cloud—both device firmware and boot loaders. Customers can maintain this authentication across firmware updates and OS updates without needing to adjust to variations between firmware suppliers used in their cloud.

As described herein, in some embodiments, a system and method may be provided for selecting pre-boot code modules to trust, (b) exporting selected image digests, and (c) importing signed image digests. For example, a BIOS user interface can be accessed via both a local console as well as an out-of-band console (i.e., via service processor or BMC 132). The user interface may be interactive or programmatically controlled.

Such systems and methods may include multiple hardware platforms controlled in a one-to-many manner (one user interface used for configuring many hardware platforms). For example, a user may provision and maintain authentication of pre-boot code modules across a datacenter or cloud.

In an embodiment, a user (via the BIOS's user interface) exports one or more image digests to a user file system, signs each digest individually, and imports signed image digests (or digital signatures) into db2 405 in secure BIOS/EFI firmware 136's non-volatile storage. In some cases, the user signs multiple digests as a group instead of signing each digest individually. If a pre-boot module fails standard Secure Boot policy verification, BIOS/EFI firmware 136 first calculates the digest for each pre-boot module, searches db2 405 for a matching digest, and then verifies the signature of the matching digest against policy 400.

In another, alternative or additional embodiment, a user selects one or more pre-boot code module images that are listed in the user interface, causing BIOS/EFI firmware 136 to add digests for those images to db 403 of Secure Boot policy 400. In some cases, BIOS/EFI firmware 136 may add image digests for selected images to the dbx 404 of policy 400.

In yet another, alternative or additional embodiment, a user asserts a single configuration option in the user interface, causing BIOS/EFI firmware 136 to add image digests for all third-party pre-boot images in the current configuration to db 403 in Secure Boot policy 400. BIOS/EFI firmware 136 removes all other image digests in db 403 that are not present in the current system configuration.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," when used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
a processor; and
a Basic Input/Output System (BIOS) coupled to the processor, the BIOS having program instructions stored thereon that, upon execution, cause the IHS to:
  receive, from a user during a boot process, selection of a pre-boot code module;
  export, during the boot process, a digest of the pre-boot code module to the user;
  import, during the boot process, a signed digest signed by the user;
  store a public key or certificate usable to authenticate the signed digest in a primary database (db) of a Secure Boot policy, wherein the primary database (db) does not allow storage of the signed digest;
  store the signed digest in a secondary database (db2) of the Secure Boot policy, wherein the secondary database is distinct from a revoked signature database (dbx) of the Secure Boot policy; and
  in response to the pre-boot code module failing Secure Boot verification during a subsequent booting of the IHS:
    calculate a digest for the pre-boot code module;
    search the secondary database (db2) of the Secure Boot policy for a digest matching the calculated digest;
    in response to finding the matching digest in the secondary database (db2), verify the signature of the matching digest against one or more public keys or certificates stored in the primary database (db) of the Secure Boot policy; and
    in response to verification of the signature of the matching digest, load the pre-boot code module.

2. The IHS of claim 1, wherein the pre-boot code module includes an input/output (I/O) device firmware.

3. The IHS of claim 1, wherein the pre-boot code module includes an Operating System (OS) boot loader.

4. The IHS of claim 1, wherein the program instructions, upon execution, further cause the IHS to provide a list of pre-boot code modules to the user prior to receiving the selection from the user.

5. The IHS of claim 1, wherein the receiving, exporting, and importing operations are performed via a baseboard management controller (BMC).

6. The IHS of claim 1, wherein the selection includes other pre-boot code modules, wherein exporting the digest includes exporting a distinct digest for each of the selected pre-boot code modules, and wherein importing the digest includes importing each of the distinct digests signed with a same or a different key.

7. The IHS of claim 1, wherein the program instructions, upon execution, further cause the IHS to allow the user to remove the Certificate Authority (CA)-issued public key or certificate corresponding to the selected pre-boot code module from the primary database (db).

8. The IHS of claim 1, wherein the pre-boot code module is selected indirectly as part of an operation initiated by the user to trust a current IHS configuration.

9. The IHS of claim 8, wherein the current IHS configuration includes additional pre-boot code modules.

10. The IHS of claim 8, wherein the program instructions, upon execution, further cause the IHS to:
  remove digests from the primary database (db) of the Secure Boot policy for pre-boot code modules previously trusted as part of a previous IHS configuration;
  calculate digests for pre-boot code modules part of the current IHS configuration; and
  store the calculated digests in the primary database (db) of the Secure Boot policy.

11. The IHS of claim 1, wherein the program instructions, upon execution, further cause the IHS to:
  receive, from the user, selection of another pre-boot code module; and
  add a digest of the another pre-boot code module to the revoked signature database (dbx) of the Secure Boot policy.

12. A Basic I/O System (BIOS) having program instructions stored thereon that, upon execution by a processor of an Information Handling System (IHS), cause the IHS to:

provide, during a boot process, a list of pre-boot code modules to a user;

receive, from the user during the boot process, selection of a pre-boot code module;

export, during the boot process, a digest of the pre-boot code module to the user;

import, during the boot process, a digest signed by the user;

store, during the boot process, a public key or certificate usable to authenticate the signed digest in a primary database (db) of the Secure Boot policy, wherein the primary database (db) does not allow storage of the signed digest;

store, during the boot process, the signed digest in a secondary database (db2) of the Secure Boot policy wherein the secondary database (db2) is distinct from a revoked signature database (dbx) of the Secure Boot policy; and in response to the pre-boot code module failing Secure Boot verification during a subsequent booting of the IHS:

calculate a digest for the pre-boot code module;

search the secondary database (db2) of the Secure Boot policy for a digest matching the calculated digest;

in response to finding the matching digest in the secondary database (db2), verify the signature of the matching digest against one or more public keys or certificates stored in the primary database (db) of the Secure Boot policy; and in response to verification of the signature of the matching digest, load the pre-boot code module.

13. The BIOS of claim 12, wherein the pre-boot code module includes an input/output (I/O) device firmware or an Operating System (OS) boot loader.

14. In an Information Handling System (IHS) having a Basic I/O System (BIOS), a method comprising:

providing, during a boot process by the IHS through execution of program instructions stored in the BIOS, a list of pre-boot code modules;

receiving, during the boot process at the IHS through execution of program instructions stored in the BIOS, selection of a pre-boot code module;

exporting, during the boot process by the IHS through execution of program instructions stored in the BIOS, a digest of the pre-boot code module;

importing, during the boot process by the IHS through execution of program instructions stored in the BIOS, the digest signed by the user;

storing, during the boot process by the IHS through execution of program instructions stored in the BIOS, a public key or certificate usable to authenticate the signed digest in a primary database (db) of the Secure Boot policy, wherein the primary database (db) does not allow storage of the signed digest;

storing, during the boot process by the IHS through execution of program instructions stored in the BIOS, the signed digest in a secondary database (db2) of the Secure Boot policy, wherein the secondary database (db2) is distinct from a revoked signature database (dbx) of the Secure Boot policy; and in response to the pre-boot code module failing Secure Boot verification during a subsequent booting of the IHS:

calculating, by the IHS through execution of program instructions stored in the BIOS, a digest for the pre-boot code module;

searching, by the IHS through execution of program instructions stored in the BIOS, the secondary database (db2) of the Secure Boot policy for a digest matching the calculated digest;

in response to finding the matching digest in the secondary database (db2), verifying, by the IHS through execution of program instructions stored in the BIOS, the signature of the matching digest against one or more public keys or certificates stored in the primary database (db) of the Secure Boot policy; and in response to verification of the signature of the matching digest, loading, by the IHS through execution of program instructions stored in the BIOS, the pre-boot code module.

15. The method of claim 14, wherein the pre-boot code module includes an input/output (I/O) device firmware or an Operating System (OS) boot loader.

* * * * *